US011275339B2

(12) United States Patent
Collings et al.

(10) Patent No.: US 11,275,339 B2
(45) Date of Patent: Mar. 15, 2022

(54) HOLOGRAPHIC DISPLAY DEVICE AND METHOD

(71) Applicant: Dualitas Ltd, Knowlhill (GB)

(72) Inventors: Neil Collings, Knowlhill (GB); Jamieson Christmas, Knowlhill (GB)

(73) Assignee: DUALITAS LTD, Milton Keynes (GB)

( * ) Notice: Subject to any disclaimer, the term of this patent is extended or adjusted under 35 U.S.C. 154(b) by 100 days.

(21) Appl. No.: 16/665,174

(22) Filed: Oct. 28, 2019

(65) Prior Publication Data
US 2020/0166890 A1 May 28, 2020

(30) Foreign Application Priority Data
Nov. 27, 2018 (GB) .................................... 1819250

(51) Int. Cl.
G03H 1/08 (2006.01)
G03H 1/04 (2006.01)
(Continued)

(52) U.S. Cl.
CPC ......... *G03H 1/0866* (2013.01); *G03H 1/0443* (2013.01); *G03H 1/12* (2013.01); *G03H 1/16* (2013.01); *G03H 2001/045* (2013.01)

(58) Field of Classification Search
CPC ...... G03H 1/0866; G03H 1/0443; G03H 1/12; G03H 1/16; G03H 2001/045; G03H 1/00;
(Continued)

(56) References Cited

U.S. PATENT DOCUMENTS 10,481,554 B2 * 11/2019 Christmas ............ G03H 1/2294
2010/0142014 A1 * 6/2010 Rosen .................. G03H 1/0402
359/1
(Continued)

FOREIGN PATENT DOCUMENTS

GB 2496108 A 5/2013
GB 2526275 A 11/2015
(Continued)

OTHER PUBLICATIONS

Copending U.S. Appl. No. 16/665,194, filed Oct. 28, 2019.
(Continued)

Primary Examiner — Arnel C Lavarias
(74) Attorney, Agent, or Firm — McDonnell Boehnen Hulbert & Berghoff LLP

(57) ABSTRACT

A holographic display method includes calculating a hologram, displaying it on a spatial light modulator (SLM) and illuminating it with coherent light. The hologram includes hologram pixels each having a hologram pixel value. The hologram is calculated using steps including: performing the inverse Fourier transform of the product of an object field and a negative quadratic phase exponential representative of positive optical power; and restricting each calculated hologram pixel value to one of a plurality (greater than two) of allowable pixel values to form a constrained hologram, which is displayed on the SLM. Each light-modulating pixel of the SLM is operable in a plurality of light-modulation levels corresponding to the plurality of allowable pixel values. The SLM is illuminated with coherent light to form a replay field including conjugate images: a real holographic reconstruction and a virtual holographic reconstruction having greater intensity than that of the real holographic reconstruction.

14 Claims, 9 Drawing Sheets

(51) Int. Cl.
*G03H 1/12* (2006.01)
*G03H 1/16* (2006.01)

(58) Field of Classification Search
CPC .............. G03H 1/02; G03H 2001/0224; G03H 2001/0228; G03H 2001/0445; G03H 2001/0447; G03H 2001/0454; G03H 2001/046; G03H 1/08; G03H 1/0808; G03H 1/0816; G03H 2001/0825; G03H 1/0841; G03H 2001/0858; G03H 1/0891
USPC .......... 359/9, 1, 22, 29, 32, 33, 35; 430/1, 2
See application file for complete search history.

(56) References Cited

U.S. PATENT DOCUMENTS

| | | | |
|---|---|---|---|
| 2010/0165429 A1* | 7/2010 | Buckley | G02B 27/0103 359/9 |
| 2013/0265622 A1 | 10/2013 | Christmas et al. | |
| 2014/0022526 A1 | 1/2014 | Van Eijk et al. | |
| 2014/0253987 A1 | 9/2014 | Christmas | |
| 2017/0082855 A1 | 3/2017 | Christmas et al. | |
| 2017/0115627 A1 | 4/2017 | Christmas et al. | |
| 2017/0329280 A1 | 11/2017 | Rosen et al. | |
| 2017/0363869 A1 | 12/2017 | Christmas et al. | |
| 2018/0046138 A1 | 2/2018 | Christmas et al. | |
| 2018/0120768 A1 | 5/2018 | Christmas | |
| 2018/0188532 A1 | 7/2018 | Christmas et al. | |
| 2019/0041641 A1 | 2/2019 | Christmas et al. | |
| 2019/0064738 A1 | 2/2019 | Cole et al. | |

FOREIGN PATENT DOCUMENTS

| | | |
|---|---|---|
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| GB | 2560490 A | 9/2019 |
| WO | 2018/021984 A1 | 2/2018 |
| WO | 2018078366 A1 | 5/2018 |
| WO | 2018100394 A1 | 6/2018 |
| WO | 2018100397 A1 | 6/2018 |

OTHER PUBLICATIONS

Copending U.S. Appl. No. 16/679,167, filed Nov. 9, 2019.
Search Report under Section 17, United Kingdom Patent Application GB1819250.0, dated May 17, 2019.

* cited by examiner

HOLOGRAPHIC DISPLAY DEVICE AND METHOD

CROSS-REFERENCE TO RELATED APPLICATIONS

This application claims the benefit of priority of United Kingdom Patent Application no. GB1819250.0, filed Nov. 27, 2018, which is hereby incorporated herein by reference in its entirety.

FIELD

The present disclosure relates to a method of calculating a diffraction pattern, a method of calculating a hologram corresponding to an object and a method of calculating a hologram field corresponding to an object field. More specifically, the present disclosure relates to a method of holographic display such as a holographic projection. Some embodiments relate to a head-up display and a head-mounted display or near eye device

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object. A well-known problem in holography is the twin-image problem. Because the photographic plate records the intensity of the interference fringes, the replay from the plate contains both a pseudoscopic real image and an orthoscopic virtual image. In plates with a high resolution capability, the two images can be separated in 3D space using an off-axis reference beam.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example. When the hologram is encoded on a spatial light modulator, the possibility for separating the twin images in 3D space is more limited due to the limited resolution of the spatial light modulator compared with a photosensitive plate.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example. It has been appreciated that, in these applications, it may be more convenient in terms of the optical hardware, to emphasize the virtual image rather than the real image. There is disclosed herein an alternative method of calculating a hologram to emphasize the virtual image, and a method for holographic projection including the hologram which are particularly advantageous for applications including image projection such as augmented reality.

SUMMARY

Aspects of the present disclosure are defined in the appended independent claims.

There is provided a method of calculating a hologram $U_h(x,y)$ corresponding to an object having an object field $U_o(u,v)$. The hologram comprises a plurality of hologram pixels each having a hologram pixel value. The method comprises performing the inverse Fourier transform of the object field and a negative quadratic phase exponential representative of positive optical power. In order to optimise the virtual image in the resulting hologram, the method may optionally be processed by a Gerchberg-Saxton type algorithm, "GSA", in the Fresnel domain. The Gerchberg-Saxton type algorithm involves cycling between the object domain and the hologram domain using forward and inverse Fresnel transforms.

There is provided a method of holographic display. The method comprises calculating a hologram, displaying the hologram on a spatial light modulator and illuminating the hologram with coherent light. The hologram $U_h(x,y)$ corresponds to an object having an object field $U_o(u,v)$. The hologram comprises a plurality of hologram pixels each having a hologram pixel value. The first step of calculating the hologram comprises performing the inverse Fourier transform of the product of an object field and a negative quadratic phase exponential representative of positive optical power. The second step of calculating the hologram comprises restricting each calculated hologram pixel value to one of a plurality of allowable pixel values to form a constrained hologram. The number of allowable pixel values is greater than two. The constrained hologram is displayed on the spatial light modulator. The spatial light modulator comprises a plurality of light-modulating pixels. Each light-modulating pixel is selectively-operable in one of a plurality of light-modulation levels corresponding to the plurality of allowable pixel values. The spatial light modulator is illuminated with coherent light to form a replay field. More specifically, the constrained hologram is displayed on the spatial light modulator and illuminated with coherent light to form the replay field. The replay field comprises a pair of conjugate images: a real holographic reconstruction and a virtual holographic reconstruction. The hologram is such that the virtual holographic reconstruction has an intensity greater than the intensity of the real holographic reconstruction.

The step of restricting (or constraining) each hologram pixel value may be performed as part of a GSA in the Fresnel domain. The GSA may further comprise a third, fourth and fifth step. The third step comprises performing a forward Fourier transform of the product of the constrained hologram and a positive quadratic phase exponential representative of negative optical power. The positive quadratic phase exponential may be equal and opposite to the negative quadratic phase exponential used in the first step. The fourth step comprises modifying the resulting distribution by attenuating the real holographic reconstruction to form a new object field. The fifth step comprises repeating the first to fourth steps using the new object field as the object field in the next iteration of the first step.

There is therefore disclosed a method of hologram calculation using the described first and second step. The method of hologram calculation may optionally include the third, fourth and fifth steps. That is, the steps of displaying and illuminating the hologram may be omitted.

The first to fifth steps may be repeated any number of times until the constrained hologram gives rise to a virtual holographic reconstruction of adequate intensity or quality. That is, the intensity or quality of the virtual holographic reconstruction is above a threshold value. The intensity of the real holographic reconstruction may be substantially zero when the GSA is iterated sufficiently.

Each step of the method comprises processing a distribution of complex hologram values—that is, a 2D array of complex numbers where each complex number is a pixel having an amplitude component and a phase component. In some embodiments, the desired hologram is a phase hologram comprising an array of phase values. The phase hologram may be the constrained hologram formed in the second step or the phase component of the constrained hologram.

The fourth step may comprise putting the intensity (that is, the amplitude component) of the real holographic reconstruction to zero. That is, the amplitude of each pixel of the real holographic reconstruction is set to zero. The fourth step may also comprise retaining or even amplifying the virtual holographic reconstruction using, for example, a gain factor. The step of attenuating the real holographic reconstruction comprises reducing the amplitude value of each pixel in the real holographic reconstructing using an attenuation factor (or even using zero to eliminate the real holographic reconstruction entirely) before the next iteration of the GSA. Other methods of retaining the virtual holographic reconstruction and removing the real holographic reconstruction may be employed.

There is disclosed a method of calculating a hologram using a mathematical transform based on a negative quadratic phase exponential to produce a hologram having a primary holographic reconstruction which is a virtual image. This is advantageous in head-up display and head-mounted display, where the optical viewing system is simplified, since both devices depend on viewing a virtual image.

The negative quadratic phase exponential may be:

$$\exp\left[-j\frac{\pi}{\lambda z}(x^2 + y^2)\right],$$

wherein z is the absolute distance from the spatial light modulator to the virtual holographic reconstruction.

The method may further comprise calculating a second hologram corresponding to a second object having an intensity distribution, wherein the second hologram comprises a plurality of hologram pixels each having a hologram pixel value and calculating the second hologram comprises: performing the inverse Fourier transform of the product of the intensity distribution of the second object and a second negative quadratic phase exponential representative of second negative optical power; and quantising each calculated hologram pixel value to one of the plurality of allowable pixel values. The second hologram is displayed on the spatial light modulator. The step of illuminating the second hologram with coherent light forms a second real holographic reconstruction and a second virtual holographic reconstruction having an intensity greater than the intensity of the second real holographic reconstruction, wherein the distance from the spatial light modulator to the second virtual holographic reconstruction is not equal to the distance from the spatial light modulator to the first virtual holographic reconstruction. Accordingly, a method of holographic projection is provided in which holographically reconstructed images may be formed at a plurality of different distances from the spatial light modulator. For example, a dual-plane head-up display may be provided.

The method further comprises augmenting reality with the image of the virtual holographic reconstruction. There is also provided herein a holographic display, picture generating unit, head-up display, head-mounted display and near-eye device incorporating these methods.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the original object or a mathematical transform of the object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object or a mathematical transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values), wherein the number of allowed modulation levels is greater than two. The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field. In some embodiments, $2^N$ light modulation levels are used wherein N is greater than 1 such as greater than 4 or greater than 6.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other within the scope of the claims. Some embodiments may be carried out independently from each other, or may be carried out together in co-dependent relationship within the scope of the claims.

Optical Configuration

Figure 1:
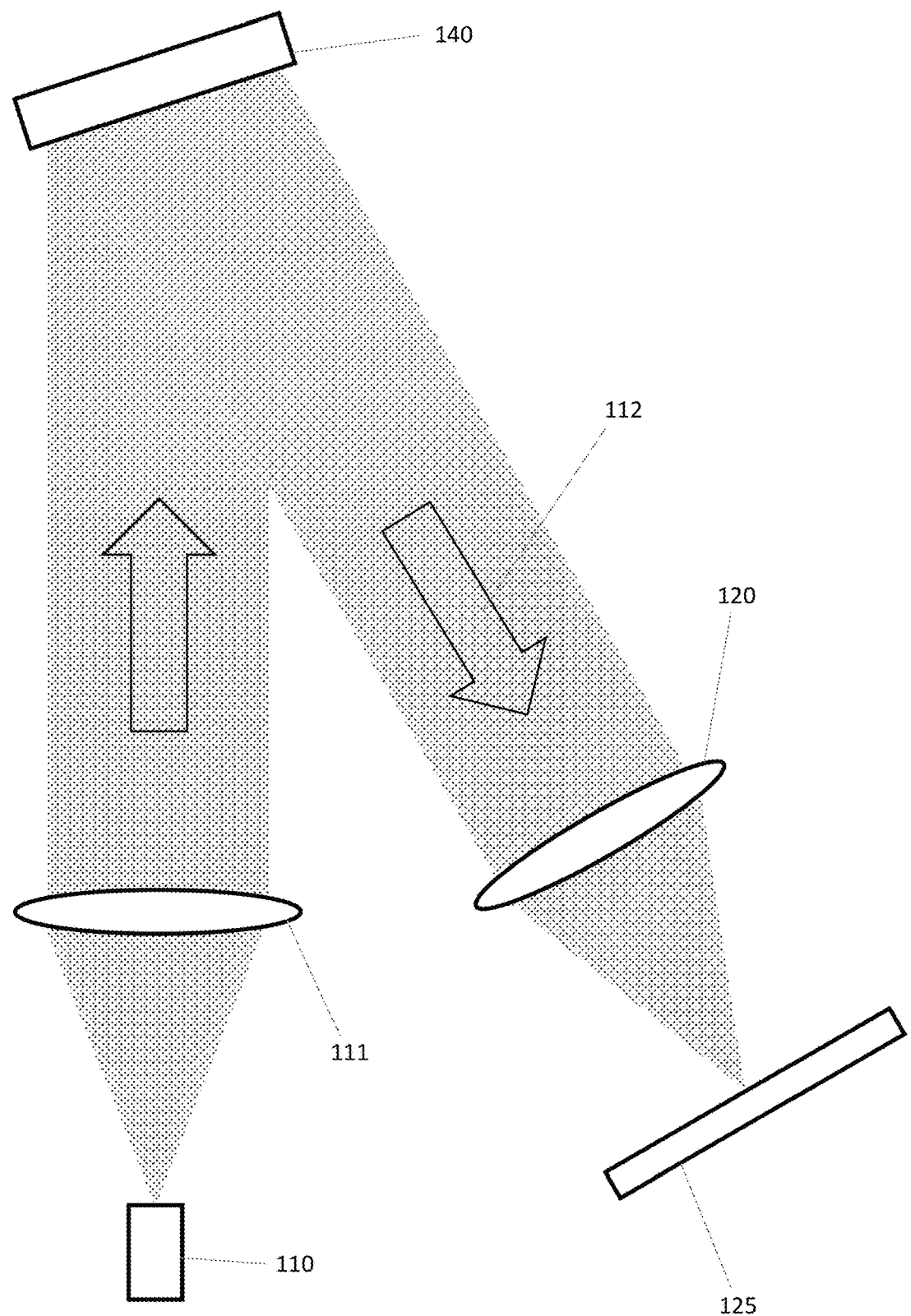
FIG. 1 is a schematic showing a reflective SLM producing a holographic reconstruction on a screen.

FIG. 1 shows an embodiment in which a computer-generated hologram is encoded on a single spatial light modulator. In this example, the computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the focusing power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Calculation of a Far-Field Hologram

A hologram which is the Fourier transform of the desired object field may be called a Fourier hologram or Fourier-transform hologram. If a Fourier hologram is illuminated with coherent light, a holographic reconstruction will be formed in the far field. A lens may be used to move the far-field reconstruction to the focal plane of the lens as described with reference to FIG. 1. The lens may be a physical optic disposed downstream the hologram or a diffractive light-modulation pattern combined with the hologram to provide a lensing effect. The diffractive pattern providing a lensing effect may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. The software lens and hologram may be combined by simple addition (modulo 1 or $2\pi$, depending on whether it is an amplitude or phase structure)

Figure 2A:
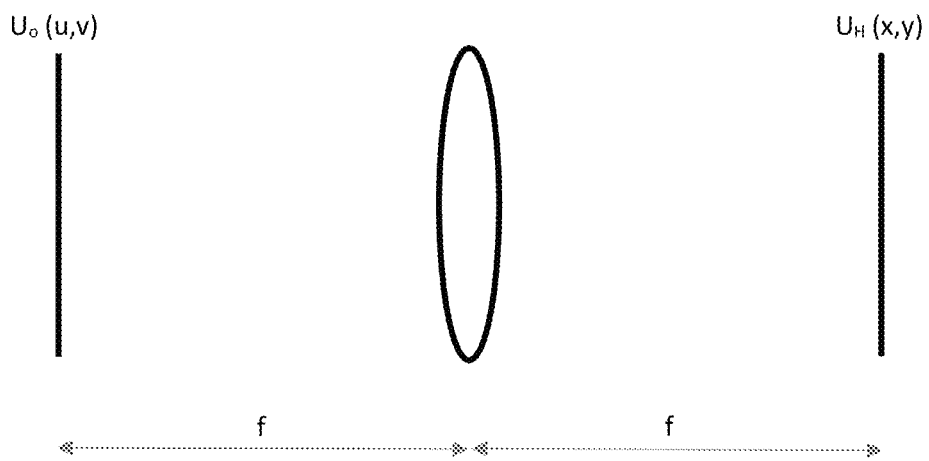
FIG. 2A illustrates the geometry when the hologram is a far-field hologram.

FIG. 2A shows the relationship between the hologram field $U_h(u,v)$ and object field $U_o(x,y)$ in the case of a Fourier hologram. The hologram field $U_h(u,v)$ and object field $U_o(x,y)$ exist in the front and back focal planes of a lens having a focal length, f. The hologram field $U_h(u,v)$ and object field $U_o(x,y)$ are related by a Fourier transform:

$$U_o(x, y) = \frac{1}{\lambda f} \int\!\!\!\int_{-\infty}^{\infty} U_h(u, v) \exp\left[-j\frac{2\pi}{\lambda f}(xu + yv)\right] du\, dv \quad (1)$$

wherein $\lambda$ is the wavelength of the light used for reconstruction.

An improved Fourier hologram may be formed using an iterative GSA as known in the art. The hologram calculated in accordance with the present disclosure may be a phase hologram, an amplitude hologram or a complex hologram.

Calculation of a Near-Field Hologram

A hologram which forms a focused holographic reconstruction in the near-field may be called a near-field hologram. A near-field hologram may be calculated from an object field using a Fresnel transform in which case the hologram field is the Fresnel transform of the object field.

Figure 2B:
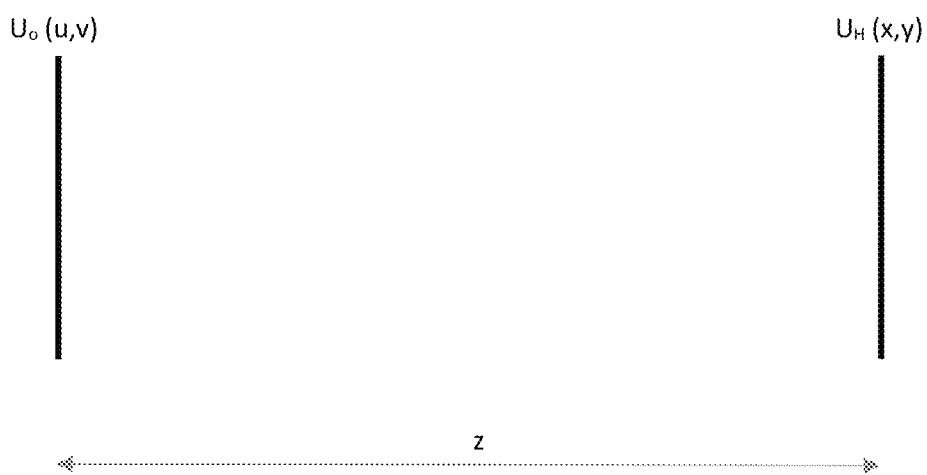
FIG. 2B illustrates the geometry when the hologram is a near-field hologram.

FIG. 2B shows the relationship between the hologram field $U_h(u,v)$ and object field $U_o(x,y)$ in the case of a Fresnel hologram. The hologram field $U_h(u,v)$ and object field $U_o(x,y)$ are related by the Fresnel diffraction integral:

$$U_o(x, y) = \quad (2)$$
$$e^{jkz}\frac{e^{j\frac{\pi}{\lambda z}(x^2+y^2)}}{j\lambda z}\int\!\!\!\int_{-\infty}^{\infty} U_h(u, v) e^{j\frac{\pi}{\lambda z}(u^2+v^2)} \exp\left[-j\frac{2\pi}{\lambda z}(xu + yv)\right] du\, dv$$

wherein z is the propagation distance between the object plane and hologram plane. The Fresnel diffraction integral may be recognisable, aside from the multiplicative factors, as the Fourier transform of the product of the object field and a quadratic phase exponential.

In embodiments, a near-field hologram is calculated using a modified transform. In summary, calculation of the hologram in accordance with the present disclosure comprises performing the inverse Fourier transform of the product of the object field and a negative quadratic phase exponential. In some embodiments, the negative quadratic phase exponential is, $$\exp\left[-j\frac{\pi}{\lambda z}(x^2 + y^2)\right] \quad (3)$$

wherein z is the absolute distance from the spatial light modulator to the real holographic reconstruction.

The negative quadratic phase exponential is representative of positive optical power. The GSA proceeds by calculating the hologram from equation (4), which is the forward Fourier transform of the product of the object field with a negative quadratic phase exponential. After applying the SLM constraints to the hologram, e.g. phase-only, amplitude-only, or constrained amplitude-phase, the hologram is transformed to the new object field using equation (2). The amplitude of the object is replaced by the amplitude of the real object, the phase is retained, and then the cycle is repeated.

$$U_h(u, v) = \quad (4)$$
$$j\lambda z e^{-jkz} e^{-j\frac{\pi}{\lambda z}(u^2+v^2)} \int\!\!\!\int_{-\infty}^{\infty} U_o(x, y) e^{-j\frac{\pi}{\lambda z}(x^2+y^2)} \exp\left[j\frac{2\pi}{\lambda z}(xu + yv)\right] dx\, dy$$

The inventors have recognised that in certain situations a hologram calculated using a negative quadratic phase exponential is advantageous.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
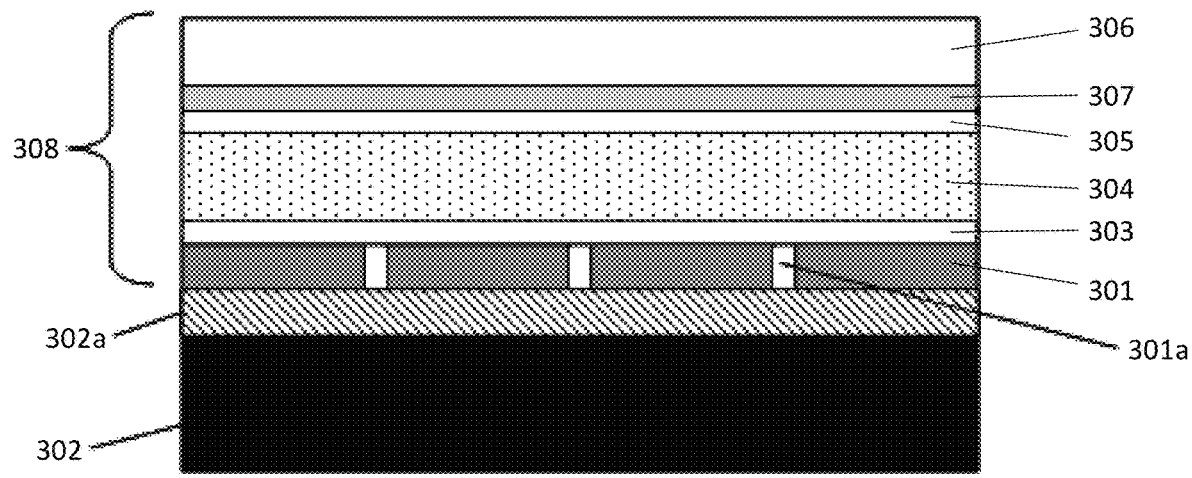
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Real and Conjugate Holographic Reconstructions

Figure 4:
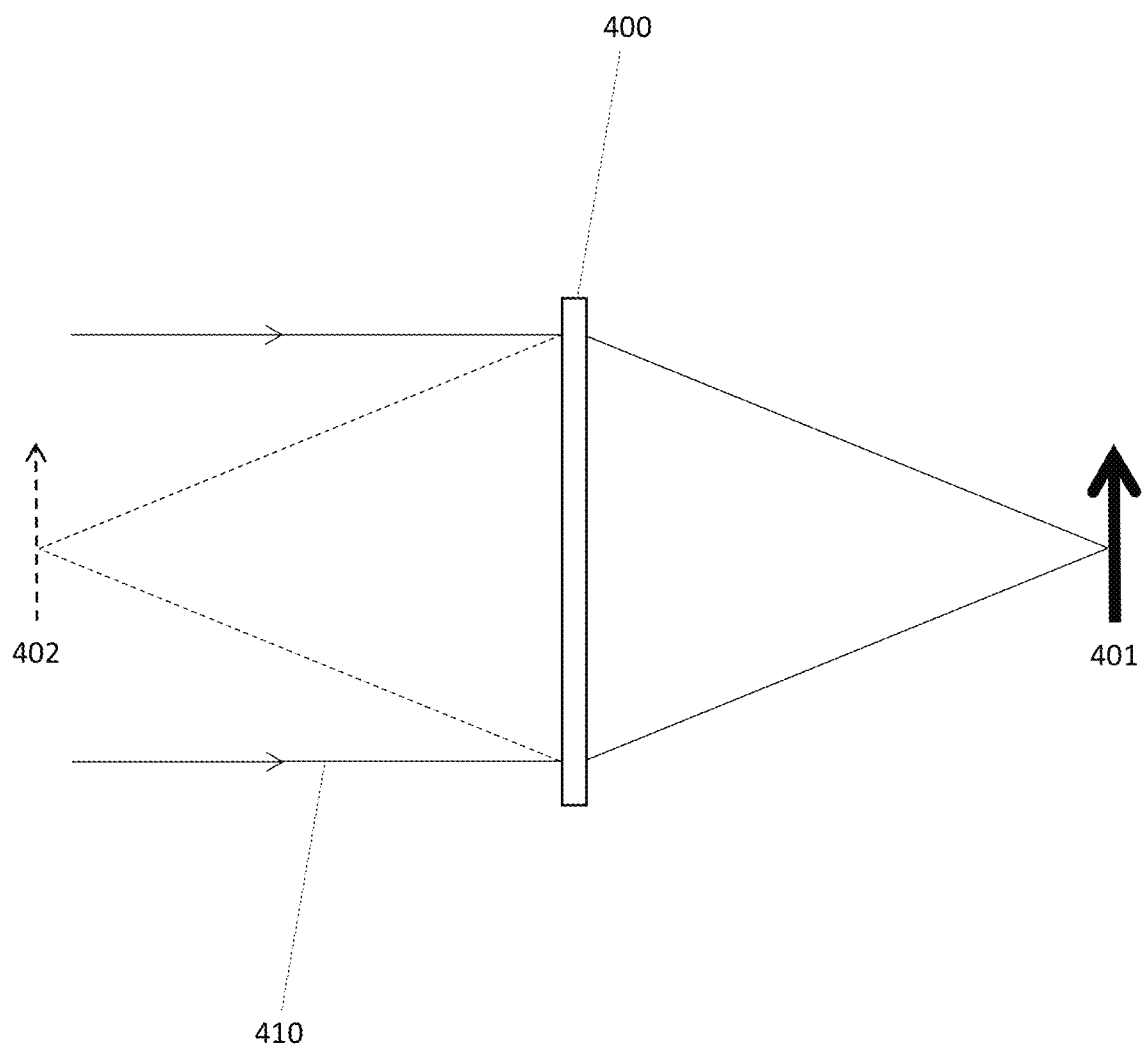
FIG. 4 illustrates formation of a holographic reconstruction from a Fresnel hologram in accordance with the prior art.

The spatial light modulator 400 of FIG. 4 is arranged to display a Fresnel transform hologram. In this example, the spatial light modulator 400 is a transmissive device but it may equally be a reflective device. When illuminated with coherent light 410, a real holographic reconstruction 401 is formed downstream the spatial light modulator 400 (to the right of the spatial light modulator 400 in FIG. 4) and a virtual holographic reconstruction 402 appears upstream the spatial light modulator 400 (to the left of the spatial light modulator 400 in FIG. 4). The real holographic reconstruction 401 and virtual holographic reconstruction 402 are conjugates. It may be said that the real holographic reconstruction is the primary reconstruction and the virtual holographic reconstruction is the conjugate holographic reconstruction. The appearance of a conjugate holographic reconstruction is owing to the limited modulation capabilities of the spatial light modulator. If we could display a complex hologram on the SLM which has been designed to output 100% of the light to either one or other of these conjugates, then this would be realised (as in the following paragraph). The real holographic reconstruction is the +1 diffracted order and the virtual holographic reconstruction is the −1 diffracted order. The distance from the spatial light modulator to the real holographic reconstruction is +z. The distance from the spatial light modulator to the virtual holographic reconstruction is −z.

In comparative examples, the computer-generated hologram may be binary which means that only two possible modulation levels are used. That is, each hologram pixel has a hologram pixel value which is either a first value (e.g. zero phase delay) or a second value (e.g. π phase delay). It is found that with a binary hologram, the primary holographic reconstruction and conjugate holographic reconstruction are of equal brightness. This is a result of diffraction efficiency being a function of the number of modulation levels—see "Introduction to Fourier Optics" by Joseph S. Goodman, third edition, page 215, FIG. 7.29. As explained in this reference, as the number of modulation levels tends to infinity, all diffraction order except the +1 order vanish and the diffraction efficiency of the +1 order approaches 100%. The intensity of the −1 diffraction order (i.e. the virtual holographic reconstruction 402 in FIG. 4) can therefore be decreased by using a multilevel hologram rather than a binary hologram which is often preferred. A multilevel hologram may be formed by quantising each calculated hologram pixel value into one of a plurality of allowable pixel values greater than two.

The hologram is calculated by steps including multiplying the object field with a negative quadratic phase exponential as shown in Equation (4). The hologram may be constrained and the object may be reconstructed, in simulation, by steps including multiplying the constrained hologram with a positive quadratic phase exponential as shown in Equation (2).

Figure 5:
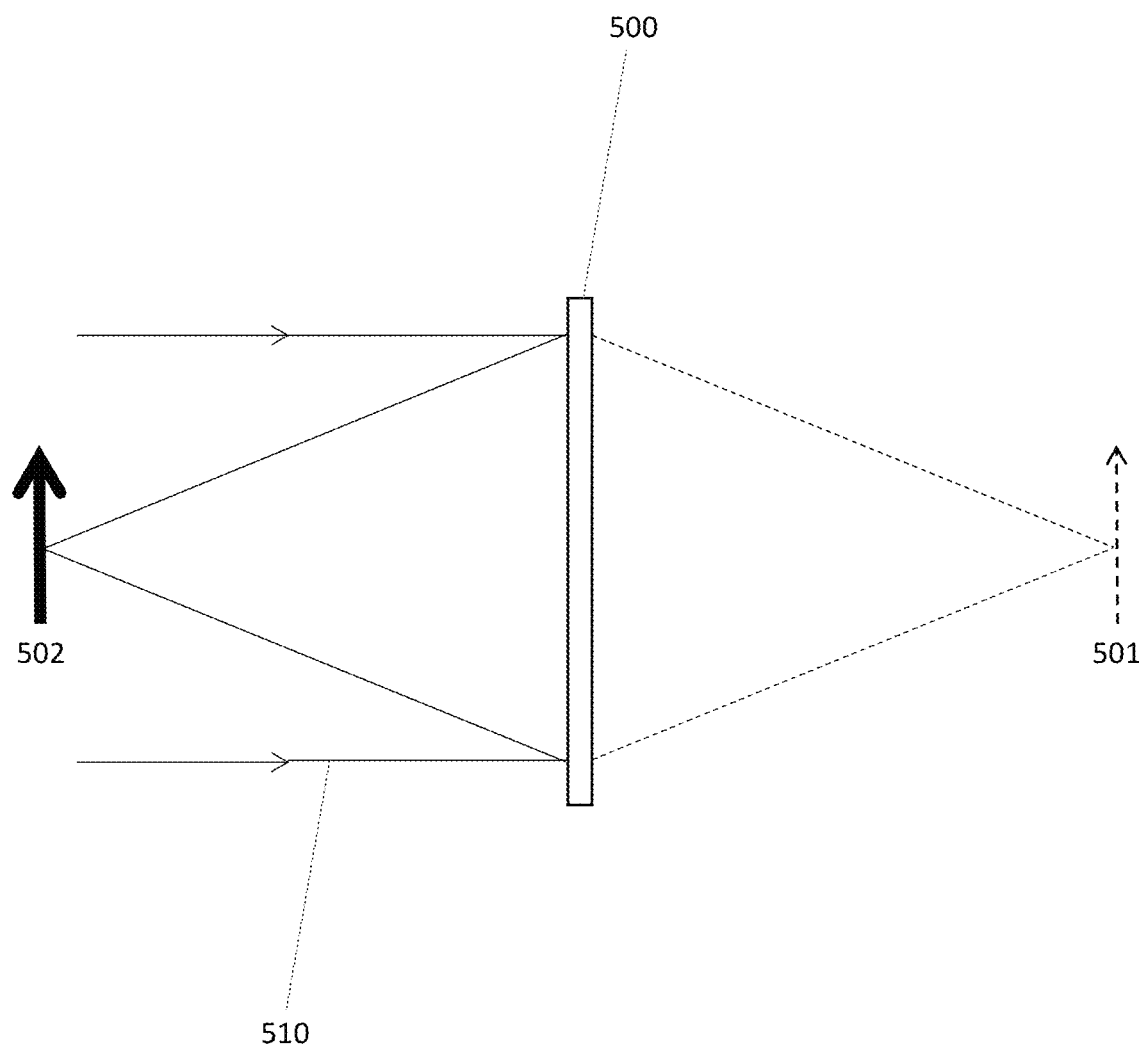
FIG. 5 illustrates formation of a holographic reconstruction from a hologram in accordance with the present disclosure.

An object reconstructed from the constrained hologram will contain both a virtual holographic reconstruction and a real holographic reconstruction. The spatial light modulator 500 of FIG. 5 is arranged to display a hologram calculated using a negative quadratic phase exponential. Specifically, FIG. 5 shows a virtual holographic reconstruction 502 which is more prominent than the real holographic reconstruction 501. In this example, the spatial light modulator 500 is a transmissive device but it may equally be a reflective device. When illuminated with coherent light 510, a real holographic reconstruction 501 is still formed downstream the spatial light modulator 500 (to the right of the spatial light modulator 500 in FIG. 4) and a virtual holographic reconstruction 502 still appears upstream the spatial light modulator 500 (to the left of the spatial light modulator 500 in FIG. 4). However, notably, the real holographic reconstruction (rather than the virtual holographic reconstruction) may be vanished if sufficient modulation levels are used. Accordingly, the primary holographic reconstruction is virtual. Further notably, the virtual holographic reconstruction is not obstructed by a real holographic reconstruction of equal brightness. It may be understood that it is not essential to the concept described herein that the real holographic reconstruction is completely vanished. Embodiments diminish the real holographic reconstruction in favour of the virtual holographic reconstruction. In embodiments, the intensity of the virtual holographic reconstruction is greater than the intensity of the real holographic reconstruction. In some embodiments, the intensity of the real holographic reconstruction is substantially zero. There is therefore provided a method which allows the virtual holographic reconstruction to be used as an image source because the obstructive real holographic reconstruction is diminished or even vanished. Use of a virtual holographic reconstruction in preference to a real holographic reconstruction may be beneficial in certain cases. Two examples are given below with reference to FIGS. 6-8.

The method of calculating the hologram may include additional steps which are optional but further improve the prominence of the virtual holographic reconstruction over the real holographic reconstruction. Again, the object field reconstructed from the constrained hologram contains the desired virtual holographic reconstruction but also contains an undesired real holographic reconstruction. The method may further comprise modifying the amplitude component of the reconstructed object field by attenuating, or even putting to zero, the real holographic reconstruction—that is, the part of the reconstructed object field which includes the real holographic reconstruction. The reconstructed object field may also be modified by additionally or alternatively replacing the amplitude component of the virtual holographic reconstruction with the required amplitude field—that is, replacing the part of the object field containing the virtual holographic reconstruction with the actual desired image. A modified amplitude field is therefore formed. The modified amplitude field may be used for further iterations of the inverse Fourier transform including a negative quadratic phase exponential. That is, the modified amplitude field may be used for further iterations of a Gerchberg-Saxton type algorithm. Specifically, the modified amplitude field and the phase field reconstructed from the constrained hologram formed the complex object field for another iteration of the algorithm. The cycle of inverse and forward Fourier transforms may be repeated until the constrained hologram forms a virtual holographic reconstruction of satisfactory quality.

Example 1—Head-Up Display

A multi-plane head-up display is a head-up display in which information may be presented at a plurality of different distances from the viewer. For example, a dual-plane head-up display might be able to display first information in a first plane a first distance from the viewer and display second information in a second plane a second distance from the viewer, wherein the first distance is not equal to the second distance. British patent 2,482,065 discloses an optical viewing system for a holographic projector which may be used as the basis of a multi-plane head-up display.

Figure 6A:
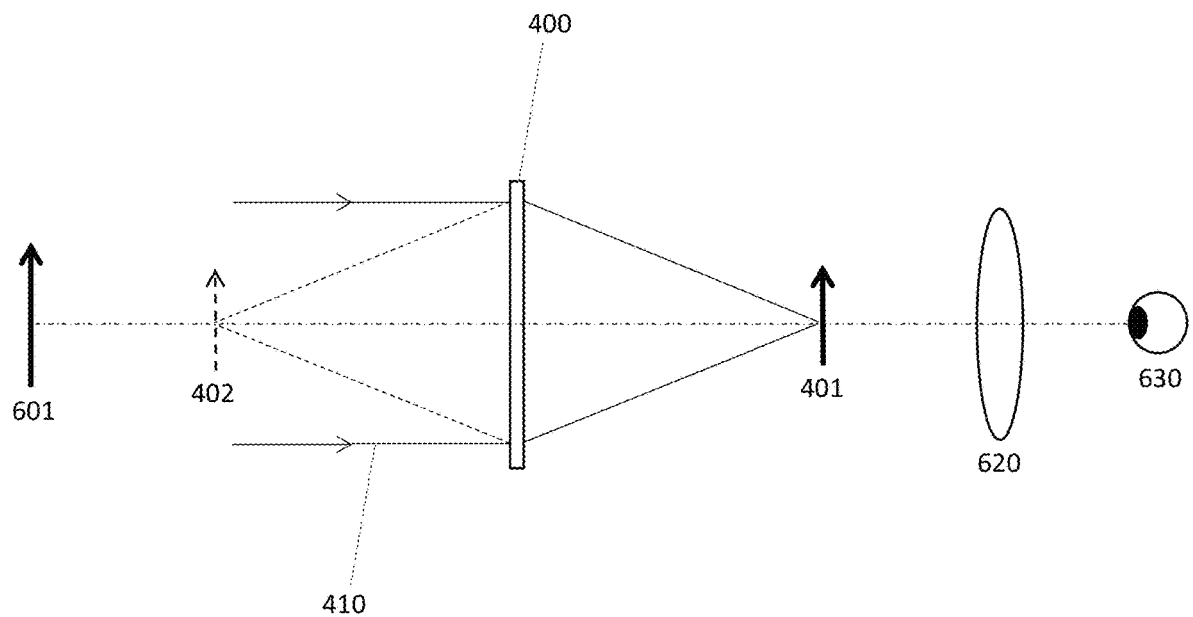
FIG. 6A shows an optical viewing system in accordance with the prior art.

FIG. 6A shows core components of the previously-disclosed optical viewing system. If the system is incorporated in a head-up display for a vehicle, the windscreen of the vehicle may be used as a combiner to augment a view of a real-world scene with the holographic image. A windscreen is not shown in FIG. 6A for simplicity.

FIG. 6A shows the spatial light modulator 400 of FIG. 4 arranged to display a Fresnel transform hologram. When illuminated with coherent light 410, a real holographic reconstruction 401 is formed downstream the spatial light modulator 400 (to the right of the spatial light modulator 400 in FIG. 4) and a virtual holographic reconstruction 402 appears upstream the spatial light modulator 400 (to the left of the spatial light modulator 400 in FIG. 4). As can be understood from the foregoing discussion of multi-level holograms, the intensity of the virtual holographic reconstruction 402 may be decreased by using a multi-level hologram and multi-level spatial light modulator. The virtual holographic reconstruction 402 in FIG. 6A is shown as a dotted line to depict only that the intensity of the virtual holographic reconstruction is lower than that of the real holographic reconstruction. The intensity of the virtual holographic reconstruction 402 may be substantially zero. FIG. 6A further shows a lens 620 positioned to form a virtual image 601 of the real holographic reconstruction 401. This is achieved by positioning the lens 620 such that the real holographic reconstruction 401 is within the back focal length of the lens 620. That is, the distance from the real holographic reconstruction 401 to the lens 620 is less than the focal length of the lens 620. A virtual image 601 of the real holographic reconstruction is formed upstream of the spatial light modulator 400. The optical power of the lens 620 and its distance from the real holographic reconstruction 401 determine the position of the virtual image 601. British patent 2,482,065 describes how the power of the software lens displayed on the spatial light modulator 400 with the hologram may be varied in order to change the position of the real image 401. This shifts the position of real image 401 with respect to lens 602 and this moves the position of virtual image 601. Accordingly, a software-controlled multi-plane head-up display may be formed. Central to this device is the formation of a virtual image.

Figure 6B:
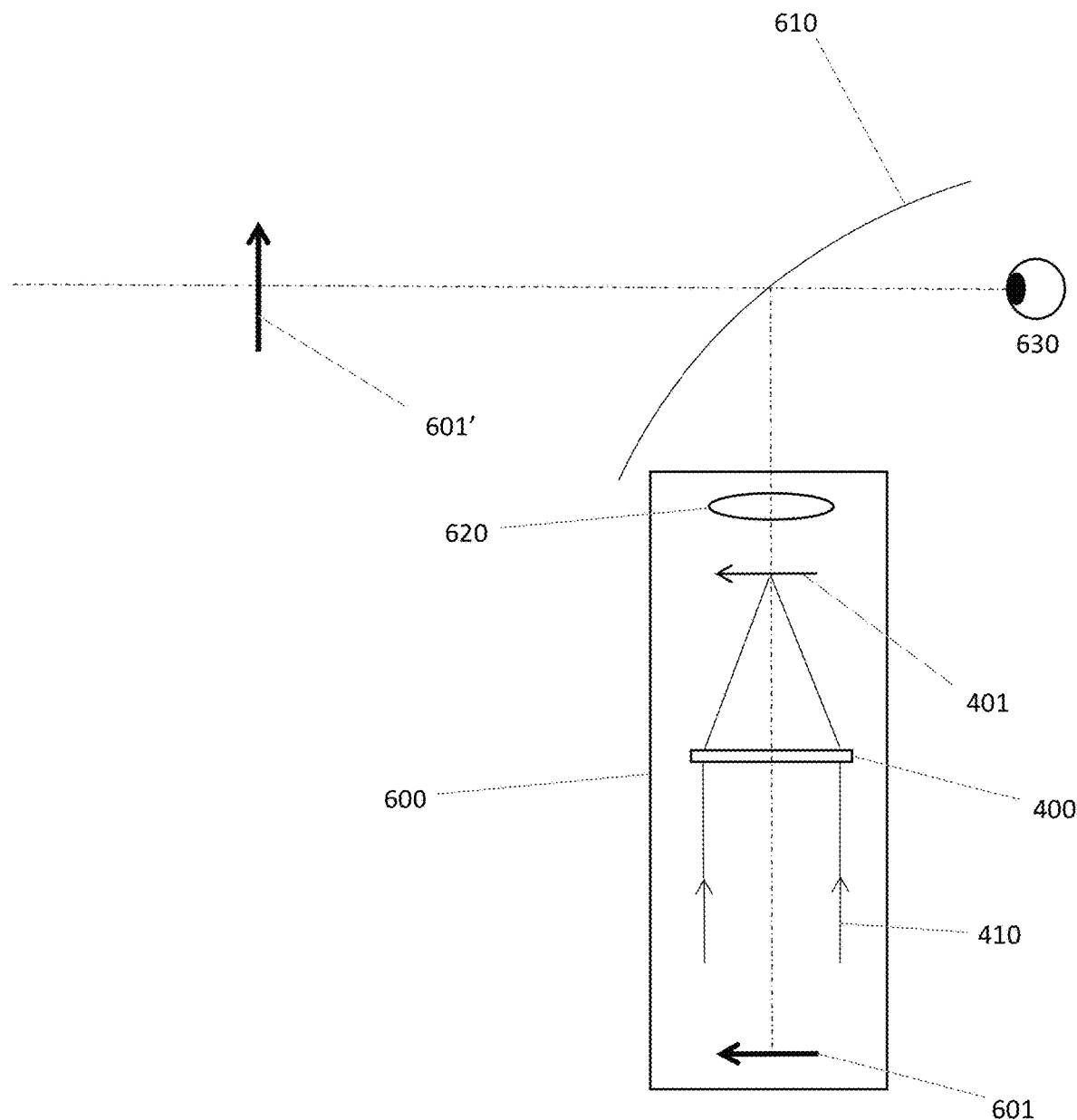
FIG. 6B shows a head-up display including the optical viewing system of the prior art.

FIG. 6B shows a head-up display 600 including the optical viewing system of FIG. 6A and a windscreen 610 functioning as an optical combiner. The viewer 630 perceives the virtual image 601 formed by lens 620 at plane 601' through the windscreen 610 owing to the reflectivity of the windscreen even if that reflectivity is low. The virtual holographic reconstruction 402 is omitted from FIG. 6B for simplicity in the drawing.

Figure 7:
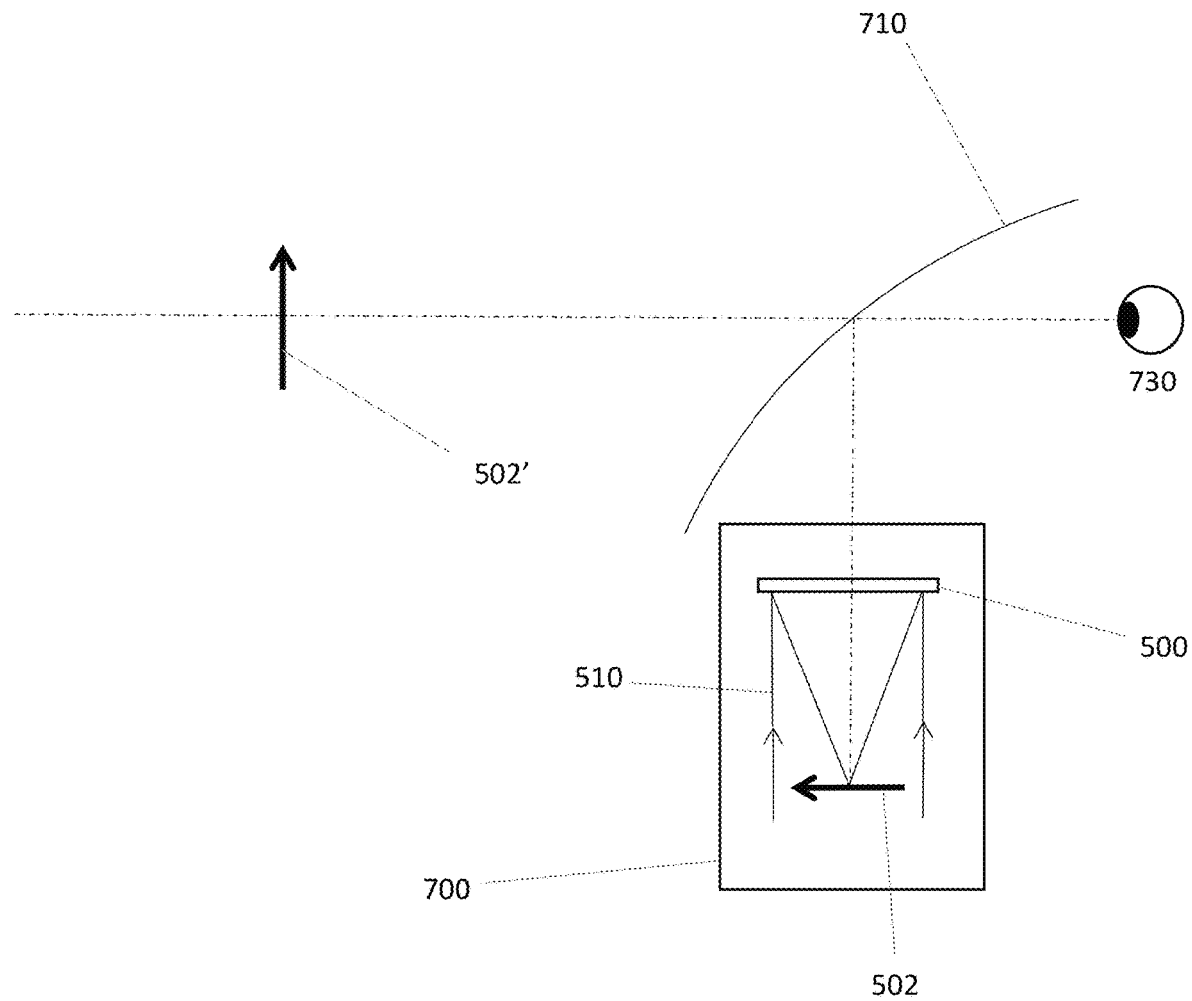
FIG. 7 shows a head-up display in accordance with embodiment.

FIG. 7 shows a head-up display 700 in which the hologram is calculated by the method described in the previous section entitled "Real and conjugate holographic reconstructions". A spatial light modulator 500 is arranged to display this hologram such that a virtual holographic reconstruction 502 is formed upstream, as previously-described. In this example, sufficient light modulation levels are used such that the real holographic reconstruction is not visible under normal operating conditions. For example, the hologram may comprise 8, 16, 32, 64 or 128 modulation levels. It may be understood that lens 620 of FIG. 6A is not required because the primary holographic reconstruction is upstream the spatial light modulator 500. There is therefore provided a less complex head-up display. For example, the component count is reduced. FIG. 7 shows a windscreen 710 functioning as a combiner. The virtual holographic reconstruction 502 is reflected by windscreen 710 and appears to the viewer 730 at plane 502'. The distance from the viewer 730 to plane 502' is equal to the distance from the viewer 730 to the virtual holographic reconstruction 502 unless the windscreen 710 has optical power (which it may do). For the avoidance of doubt, the presence of a windscreen or combiner is not essential. It may be understood that the combination of the described hologram calculation method and a multi-level modulation scheme enables lens 620 to be omitted. There is provided an improved virtual image formation device which is particularly suitable for a head-up display.

The optical power associated with the quadratic phase exponential determines the propagation distance, z, from the hologram plane to replay plane. It will therefore be understood that time division multiplexing may be used to present different holographic reconstructions at different distances from the spatial light modulator in time. For example, a first hologram may be calculated based on a first negative quadratic phase exponential providing a first positive optical power and a second hologram may be calculated based on a second negative quadratic phase exponential providing second positive optical power. The first optical power may be different to the second optical power. In some embodiments, a dual-plane head-up display is provided by using two different negative quadratic phase exponentials to display virtual images at two different planes in space. In some embodiments, a multi-plane head-up display is provided. In embodiments, time division multiplexing is used to display Fresnel holograms with predominantly real images and holograms based on the present method with predominantly virtual images.

Although embodiments describe 2D virtual holographic reconstructions, the present disclosure is not limited to 2D. In some embodiments, holograms giving rise to 3D virtual holographic reconstructions are calculated based on use of the disclosed method.

Example 2—Near-Eye Device or Head-Mounted Display

Figure 8:
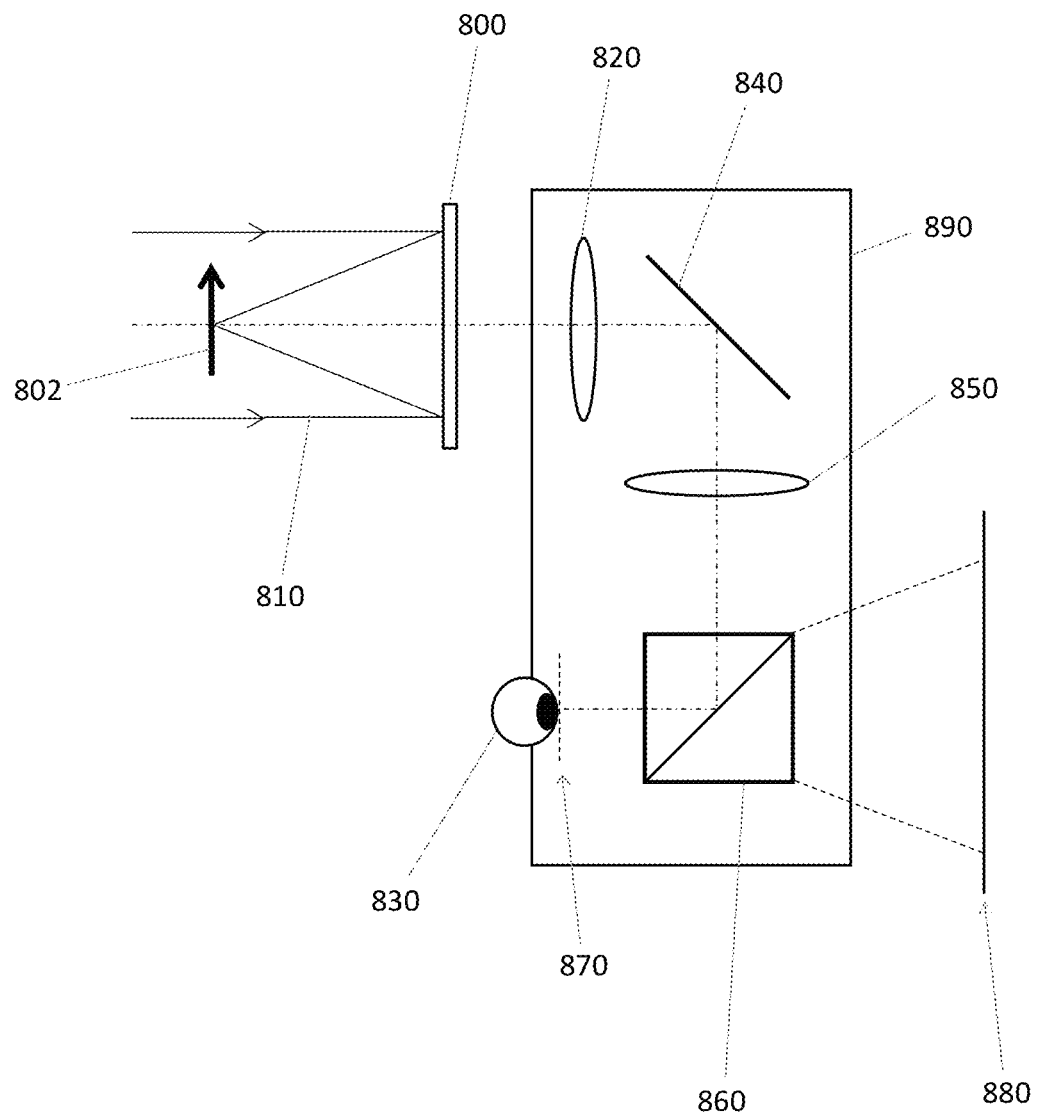
FIG. 8 shows a near-eye device in accordance with further embodiments.

An example near-eye device which also benefits from use of the disclosed method is shown in FIG. 8. A spatial light modulator 800 is arranged to display the holograms calculated according to this method such that a virtual holographic reconstruction 802 is formed upstream the spatial light modulator 800, as previously-described. In this example, sufficient light modulation levels are used such that the real holographic reconstruction is not visible under normal lighting conditions. For example, the hologram may comprise 8, 16, 32, 64 or 128 modulation levels.

A first lens 820 and second lens 850 are arranged to form a telescope which receives light from spatial light modulator 800. The telescope may magnify or de-magnify the hologram displayed on the spatial light modulator 800. For example, WO 2009/156752 discloses a configuration in which an inverted telescope is used to de-magnify the hologram. However, a telescope may equally be used to magnify the hologram or a region of the hologram. A mirror 840 between the first lens 820 and second lens 850 rotates the optical axis in a clockwise direction by 90 degrees. The mirror 840 is optional but may be advantageous in a near-eye device for providing optimal packaging. A combiner 860 combines the holographic image with a real-world scene. The combiner also rotates the optical path from the spatial light modulator by 90 degrees in a clockwise direction such that optical axis before mirror 840 is parallel to the optical axis after the combiner 860 but the light is travelling in opposite directions. The spatial light modulator and viewer may therefore be positioned on the same side of a housing including the first lens 820, second lens 850, mirror 840 and combiner 860. In this example, the combiner is a beam splitter having a first input arranged to receive light from the spatial light modulator, a second input arranged to receive light from a real-world scene and an output arranged to direct an augmented reality image to a viewer 830. An image of the hologram is formed at a plane 870 on the output side of the combiner 860. The viewer 830 positions their eyes near this plane. In this configuration, it is sometimes described that the eye performs a Fourier transform of the hologram such that a holographic reconstruction of the hologram is perceived by the viewer 830. More specifically, a holographic reconstruction of the image of the hologram is perceived by the viewer 830.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and equivalents in accordance with the doctrine of equivalents.

The invention claimed is:

1. A method of holographic display, the method comprising:
    calculating a hologram $U_h(x,y)$ corresponding to an object having an object field $U_o(u,v)$ wherein the hologram comprises a plurality of hologram pixels each having a hologram pixel value and calculating the hologram comprises:
        (i) performing an inverse Fourier transform of a product of an object field and a negative quadratic phase exponential representative of positive optical power; and
        (ii) restricting each calculated hologram pixel value to one of a plurality of allowable pixel values, wherein a number of allowable pixel values is greater than two, to form a constrained hologram, wherein the method of holographic display further comprises:
    displaying the constrained hologram on a spatial light modulator comprising a plurality of light-modulating pixels, wherein each light-modulating pixel is operable in a plurality of light-modulation levels corresponding to the plurality of allowable pixel values; and
    illuminating the spatial light modulator with coherent light to form a real holographic reconstruction and a virtual holographic reconstruction having an intensity greater than an intensity of the real holographic reconstruction.

2. A method as claimed in claim 1, wherein calculating the hologram further comprises:
    (iii) performing a forward Fourier transform of a product of the constrained hologram and a positive quadratic phase exponential representative of negative optical power;
    (iv) modifying a resulting distribution by attenuating the real holographic reconstruction to form a new object field; and
    (v) repeating steps (i) to (iv) using the new object field as the object field in step (i).

3. A method as claimed in claim 1 wherein the intensity of the real holographic reconstruction is substantially zero.

4. A method as claimed in claim 1, wherein the negative quadratic phase exponential is, $$\exp\left[-j\frac{\pi}{\lambda z}(x^2+y^2)\right]$$

wherein z is an absolute distance from the spatial light modulator to the real holographic reconstruction.

5. A method as claimed in claim 1 further comprising:
    calculating a second hologram corresponding to a second object having an intensity distribution, wherein the second hologram comprises a plurality of hologram pixels each having a hologram pixel value and calculating the second hologram comprises: performing an inverse Fourier transform of a product of an intensity distribution of the second object and a second negative quadratic phase exponential representative of second positive optical power; and quantising each calculated hologram pixel value to one of the plurality of allowable pixel values;

displaying the second hologram on the spatial light modulator; and illuminating the second hologram with coherent light to form a second real holographic reconstruction and a second virtual holographic reconstruction having an intensity greater than an intensity of the second real holographic reconstruction, wherein a distance from the spatial light modulator to the second virtual holographic reconstruction is not equal to a distance from the spatial light modulator to the first virtual holographic reconstruction.

6. A method as claimed in claim 1 further comprising calculating a second hologram corresponding to a second object having an intensity distribution, wherein the second hologram comprises a plurality of hologram pixels each having a hologram pixel value and calculating the second hologram comprises: performing an inverse Fourier transform of a product of the intensity distribution of the second object and a negative quadratic phase exponential representative of positive optical power; and restricting each calculated hologram pixel value to one of the plurality of allowable pixel values;

displaying the second hologram on the spatial light modulator; and illuminating the second hologram with coherent light to form a second real holographic reconstruction and a second virtual holographic reconstruction having an intensity less than the intensity of the second real holographic reconstruction, wherein the real holographic reconstruction and first virtual holographic reconstruction are formed on opposite sides of the spatial light modulator.

7. A holographic display comprising:

a hologram engine arranged to calculate a hologram corresponding to an object having an object field, wherein the hologram comprises a plurality of hologram pixels each having a hologram pixel value, by (i) performing an inverse Fourier transform of a product of the intensity distribution of the object and a negative quadratic phase exponential representative of positive optical power and (ii) quantising each calculated hologram pixel value to one of a plurality of allowable pixel values, wherein a number of allowable pixel values is greater than two, to form a constrained hologram;

a spatial light modulator, comprising a plurality of light-modulating pixels, arranged to display the constrained hologram, wherein each light-modulating pixel is operable in a plurality of light-modulation levels corresponding to the plurality of allowable pixel values; and a light source arranged to illuminate the spatial light modulator with coherent light to form a real holographic reconstruction and a virtual holographic reconstruction having an intensity greater than an intensity of the real holographic reconstruction.

8. A holographic display as claimed in claim 7 wherein the hologram engine is further arranged to (iii) performing a forward Fourier transform of a product of the constrained hologram and a positive quadratic phase exponential representative of negative optical power; (iv) modifying a resulting distribution by attenuating the real holographic reconstruction to form a new object field; and (v) repeating steps (i) to (iv) using the new object field as the object field in step (i).

9. A holographic display as claimed in claim 7 wherein the intensity of the real holographic reconstruction is substantially zero.

10. A holographic display as claimed in claim 7, wherein the negative quadratic phase exponential is, $$\exp\left[-j\frac{\pi}{\lambda z}(x^2 + y^2)\right]$$

wherein z is an absolute distance from the spatial light modulator to the real holographic reconstruction.

11. A head-up display for a vehicle comprising the holographic display as claimed in claim 7, wherein the virtual holographic reconstruction is used to augment reality.

12. A head-up display for a vehicle as claimed in claim 11 wherein a window of the vehicle is used to redirect an image of the virtual holographic reconstruction to a user, such as a driver, of the vehicle.

13. A head-up display for a vehicle as claimed in claim 11 wherein the holographic display is arranged to present augmented reality information to a user of the vehicle at different distances from the user by forming holograms using different negative quadratic phase exponentials having different positive optical powers.

14. A head-mounted display or near-eye device comprising the holographic display as claimed in claim 7, wherein the virtual holographic reconstruction is used to augment reality.

* * * * *